(12) United States Patent
Healy

(10) Patent No.: US 9,919,813 B2
(45) Date of Patent: Mar. 20, 2018

(54) CONTROL SYSTEM AND METHOD FOR A PLANE CHANGE FOR SATELLITE OPERATIONS

(71) Applicant: The United States of America, as represented by the Secretary of the Navy, Washington, DC (US)

(72) Inventor: Liam M. Healy, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 225 days.

(21) Appl. No.: 15/130,567

(22) Filed: Apr. 15, 2016

(65) Prior Publication Data

US 2017/0341779 A1    Nov. 30, 2017

Related U.S. Application Data

(60) Provisional application No. 62/147,671, filed on Apr. 15, 2015.

(51) Int. Cl.
*G01C 23/00* (2006.01)
*B64G 1/24* (2006.01)
*B64G 1/36* (2006.01)

(52) U.S. Cl.
CPC ............... *B64G 1/242* (2013.01); *B64G 1/36* (2013.01)

(58) Field of Classification Search
CPC .... B64G 1/242; B64G 1/1078; B64G 1/1085; B64B 2001/247
See application file for complete search history.

(56) References Cited

U.S. PATENT DOCUMENTS

| 4,657,210 | A | 4/1987 | Hubert et al. |
| 4,943,014 | A | 7/1990 | Harwood et al. |
| 5,082,211 | A | 1/1992 | Werka |
| 5,124,925 | A | 6/1992 | Gamble et al. |
| 5,160,935 | A | 11/1992 | Inamiya |
| 5,163,641 | A | 11/1992 | Yasaka |
| 5,186,419 | A | 2/1993 | Scott |
| 5,193,766 | A | 3/1993 | Kawano et al. |
| 5,242,135 | A | 9/1993 | Scott |
| 5,299,764 | A | 4/1994 | Scott |
| 5,681,011 | A | 10/1997 | Frazier |

(Continued)

OTHER PUBLICATIONS

Henshaw, C., and Sanner, R., "Variational Technique for Spacecraft Trajectory Planning," Journal of Aerospace Engineering, vol. 23, No. 3, Jul. 2010 (online pub. Jun. 15, 2010), pp. 147-156.

(Continued)

*Primary Examiner* — Richard G Davis
(74) *Attorney, Agent, or Firm* — US Naval Research Laboratory; Richard F. Bis

(57) ABSTRACT

A spacecraft control system and method for determining the necessary delta-V and timing for impulsive maneuvers to change the plane of an orbit or the size of the orbit of a secondary spacecraft that is in an orbit around a primary spacecraft. The system and method uses an apocentral coordinate system for the relative orbital motion and geometric relative orbital elements to determine the required impulsive velocity change and time to maneuver, for relative orbital changes in which only one of slant or colatitude of the sinilaterating node changes.

8 Claims, 8 Drawing Sheets

(56) References Cited

U.S. PATENT DOCUMENTS

| | | | |
|---|---|---|---|
| 5,806,801 A * | 9/1998 | Steffy | B64G 1/1085 244/158.6 |
| 5,806,802 A | 9/1998 | Scott | |
| 5,810,297 A | 9/1998 | Basuthakur et al. | |
| 5,961,077 A | 10/1999 | Koppel et al. | |
| 5,979,830 A | 11/1999 | Kellermeier | |
| 6,059,233 A | 5/2000 | Koppel et al. | |
| 6,102,334 A | 8/2000 | Claffey et al. | |
| 6,213,432 B1 | 4/2001 | Koppel | |
| 6,233,507 B1 | 5/2001 | May | |
| 6,253,124 B1 | 6/2001 | Belbruno | |
| 6,305,646 B1 | 10/2001 | McAllister et al. | |
| 6,315,248 B1 | 11/2001 | Rockwell | |
| 6,327,523 B2 | 12/2001 | Cellier | |
| 6,389,336 B2 | 5/2002 | Cellier | |
| 6,484,973 B1 | 11/2002 | Scott | |
| 6,845,950 B1 | 1/2005 | Goodzeit et al. | |
| 6,999,860 B2 | 2/2006 | Belbruno | |
| 7,113,851 B1 | 9/2006 | Gelon et al. | |
| 7,480,506 B2 | 1/2009 | Wang | |
| 7,918,420 B2 | 4/2011 | Ho | |
| 8,096,511 B2 | 1/2012 | Frenkiel et al. | |
| 8,439,312 B2 | 5/2013 | Ho et al. | |
| 8,567,725 B2 | 10/2013 | Wright | |
| 8,628,044 B2 | 1/2014 | Poulos | |
| 8,768,622 B2 | 7/2014 | Healy | |
| 2005/0258311 A1 | 11/2005 | Scott | |
| 2007/0179685 A1 | 8/2007 | Milam et al. | |
| 2007/0228220 A1 | 10/2007 | Behrens et al. | |
| 2007/0250267 A1 | 10/2007 | Jaeger et al. | |
| 2007/0285304 A1 | 12/2007 | Cooper | |
| 2009/0132105 A1 | 5/2009 | Paluszek et al. | |
| 2010/0006704 A1 | 1/2010 | Sainct et al. | |
| 2011/0036951 A1 | 2/2011 | Moorer et al. | |
| 2011/0036952 A1 | 2/2011 | Moorer, Jr. et al. | |
| 2011/0144835 A1 | 6/2011 | Ho | |
| 2015/0220488 A1 | 8/2015 | Healy | |

OTHER PUBLICATIONS

Healy, L.M., and Henshaw, C.G., "Passively safe relative motion trajectories for on-orbit inspection", AAS 10-265, Proceedings of the AAS/AIAA Space FlightMechanics Meeting held Feb. 14-17, 2010, San Diego, CA, vol. 136, Part 1, pp. 2439-2458, (Oct. 2010).

Healy, L.M., and Henshaw, C.G., "Formation maneuver planning for collision avoidance and direction coverage", AAS-12-102, Proceedings of the AAS/AIAA Space Flight Mechanics Meeting held Jan. 29-Feb. 2, 2012, Charleston, SC, vol. 143, Part, pp. 25-44, (Jul. 2012).

Scharf, D.P., Hadaegh, F.Y., and Kang. B.H., "A survey of spacecraft formation flying guidance and control (Part I): Guidance", Proceedings of the 2003 American Control Conference, Denver, CO, USA, Jun. 2003, pp. 1733-1739.

Scharf, D.P., Hadaegh, F.Y., and Ploen, S.R., "A survey of spacecraft formation flying guidance and control (Part II): Control", Proceedings of the 2004 American Control Conference, Boston, CO, USA, Jun. 2003, pp. 2976-2985.

Sabol C.; Burns, R.; McLaughlin, C.A., "Satellite Formation Flying Design and Evolution", Journal of Spacecraft and Rockets, Mar.-Apr. 2001, vol. 38, No. 2, pp. 270-278.

Battin, R. H., Introduction to the Mathematics and Methods of Astrodynamics, AIAA, New York, 1987, pp. 237-342.

Ardaens, J. S., and D'Amico, S., "Spaceborne Autonomous Relative Control System for Dual Satellite Formations," Journal of Guidance, Control, and Dynamics, vol. 32, No. 6, Nov.-Dec. 2009, pp. 1859-1870.

Yao, Y., Xie, R., and He, F., "Flyaround Orbit Design for Autonomous Rendezvous Based on Relative Orbit Elements," Journal of Guidance, Control, and Dynamics, vol. 33, No. 5, Sep.-Oct. 2010, pp. 1687-1692.

Jiang, F., Li, J., Baoyin, H., and Gao, Y., "Two-Point Boundary Value Problem Solutions to Spacecraft Formation Flying," Journal of Guidance, Control, and Dynamics, vol. 32, No. 6, Nov.-Dec. 2009, pp. 1827-1837.

Wen, C., Zhao, Y., Li, B., and Shi, P., "Solving the Relative Lambert's Problem and Accounting for Its Singularities," Acta Astronautica, vol. 97, Apr. 2014, pp. 122-129.

Richards, A., Schouwenaars, T., How, J. P., and Feron, E., "Spacecraft Trajectory Planning with Avoidance Constraints Using Mixed Integer Linear Programming," Journal of Guidance, Control, and Dynamics, vol. 25, No. 4, Jul.-Aug. 2002, pp. 755-764.

Schaub, H., "Relative Orbit Geometry Through Classical Orbit Element Differences," Journal of Guidance, Control, and Dynamics, vol. 27, No. 5, Sep.-Oct. 2004, pp. 839-848.

D'Amico, S., and Montenbruck, O., "Proximity Operations of Formation Flying Spacecraft Using an Eccentricity/Inclination Vector Separation," Journal of Guidance, Control, and Dynamics, vol. 29, No. 3, May-Jun. 2006, pp. 554-563.

Montenbruck, O., Kirschner, M., and D'Amico, S., E-/I-Vector Separation for GRACE Proximity Operations, DLR/German Space Operations Center TN 04-08, 6 pages, Dec. 2004.

Lee, S. S., "Dynamics and Control of Satellite Relative Motion: Designs and Applications," Ph.D. Dissertation, Virginia Polytechnic Inst. and State Univ., Blacksburg, VA, 165 pages, May 2009.

Hur-Diaz, S., and O'Connor, B., "Cluster Flight Application on System F6," 24th International Symposium on Space Flight Dynamics, May 2014, [online], [retrieved on Aug. 25, 2016], [retrieved from the internet URL <http://issfd.org/ISSFD_2014/ISSFD24_Paper_S9-3_Hur-Diaz.pdf>.

Gaias, G., D'Amico, S., and Ardaens, J.-S., "Angles-Only Navigation to a Noncooperative Satellite Using Relative Orbital Elements," Journal of Guidance, Control, and Dynamics, vol. 37, No. 2, Mar.-Apr. 2014, pp. 439-451.

Nayak, M. V., Beck, J. R., and Udrea, B., "Nanosatellite Maneuver Planning for Point-Cloud Generation with a Rangefinder," IEEE Transactions on Aerospace and Electronic Systems, vol. 51, No. 4, Oct 2015, p. 3085-3098.

Fehse, W., Automated Rendezvous and Docking of Spacecraft, Cambridge Univ. Press, New York, Nov. 2008, pp. 51-59.

Vallado, D.A., and McClain, W.D., Fundamentals of Astrodynamics and Applications, 4th Edition, Kluwer Academic, Norwell, MA, Mar. 2013, pp. 337-349.

Choset, H., and Kortenkamp, D., "Path Planning and Control for Free-Flying Inspection Robot in Space," Journal of Aerospace Engineering, vol. 12, No. 2, Apr. 1999, pp. 74-81.

Kasdin, N. J.; Gurfil, P., and Kolemen, E.; "Canonical Modelling of Relative Spacecraft Motion via Epicyclic Orbital Elements"; Celestial Mechanics and Dynamical Astronomy; vol. 92; No. 4; Aug. 2005; pp. 337-370.

Lovell, T. A., and Tragesser, S., "Guidance for Relative Motion of Low Earth Orbit Spacecraft Based on Relative Orbit Elements," AIAA/AAS Astrodynamics Specialist Conference and Exhibit, AIAA-2004-4988, 16 pages, Aug. 2004.

Alfriend, K.T.;. Vadali, S.R., Gurfil, P., How, J., and Breger, L., Spacecraft Formation Flying: Dynamics, Control and Navigation, Elsevier/Butterworth-Heinemann, Amsterdam, Boston, London, 2010, p. 123-137.

Thomas, S.; Mueller, J., and Paluszek, M., "Formations for Close-Orbiting Escort Vehicles," AIAA First Intelligent Systems Technical Conference, AIAA Paper 2004-6289, Sep. 2004, pp. 1-22.

Henshaw, C.; Healy, L.; and Roderick, S.; "LIIVe: A Small, Low-Cost Autonomous Inspection Vehicle," AIAA Space 2009 Conference and Exposition, AIAA Paper 2009-6544, 9 pages, Sep. 2009.

Mullins, L. D., "Initial Value and Two Point Boundary Value Solutions to the Clohessy-Wiltshire Equations," Journal of Astronautical Sciences, vol. 40, No. 4, Dec. 1992, pp. 487-501.

Lovell, T., and Tragesser, S., "Analysis of the Reconfiguration and Maintenance of Close Spacecraft Formations," Spaceflight Mechanics 2003, edited by Scheeres, D. J., Pittelkau, M. E., Proulx, R. J., and Cangahuala, L. A., vol. 114, Advances in the Astronautical Sciences, Univelt, San Diego, CA, Feb. 2003; also American Astronautical Soc. Paper 03-139, 2003, pp. 595-610.

(56) References Cited

OTHER PUBLICATIONS

Barnhart, D.; Sullivan, B.; Hunter, R.; Bruhn, J.; Fowler, E.; Hoag, L. M.; Chappie, S.; Henshaw, G.; Kelm, B. E.; Kennedy, T.; Mook, M.; and Vincent, K.; "Phoenix Program Status—2013," AIAA Space 2013 Conference and Exposition, AIAA Paper 2013-5341, Sep. 2013.

* cited by examiner

CONTROL SYSTEM AND METHOD FOR A PLANE CHANGE FOR SATELLITE OPERATIONS

CROSS-REFERENCE TO RELATED APPLICATIONS

This Application is a non-provisional under 35 USC 119(e) of, and claims the benefit of, U.S. Provisional Application 62/147,671 filed on Apr. 15, 2015, the entire disclosure of which is incorporated herein in its entirety.

BACKGROUND

1. Technical Field

The application is related to satellite guidance and control systems, to methods for determining the thrust vectors necessary for executing desired maneuvers, and in particular, to systems and methods for guidance and control of satellite proximity operations or formation flying operations.

2. Related Technology

In recent years, satellite proximity operations have become more important, and consequently, techniques for safely operating spacecraft in close proximity to each other have been developed. Artificial satellites in orbit around the earth can occasionally have problems that require a visual inspection to detect and diagnose. A small vehicle can be sent to move in a path around the satellite to take photographs and inspect or repair the larger satellite. A satellite (the secondary) circumnavigating another satellite (the primary) in order to inspect it for possible damage or failure will be guided by two goals: first, to avoid collisions with the main satellite, and second, to pass through certain directions (or perhaps, all directions) from the primary from which it is desirable to have a view; a stuck deployable might be imaged for diagnosis and repair on the ground, or perhaps an all-over surface inspection is necessary.

U.S. Pat. No. 8,768,622 to Healy, incorporated herein in its entirety, provides an apocentral coordinate system for planning spacecraft maneuvers intended to allow a secondary spacecraft to move in close proximity around a primary spacecraft for inspection or repair in a fuel- and time-saving path. Relative motion about a primary in circular orbit in terms of centered relative orbital objects is also described in L. M. Healy and C. G. Henshaw, "Passively safe relative motion trajectories for on-orbit inspection", AAS 10-265, pp. 2439 - 2458, the entire disclosure of which is incorporated herein by reference.

Some other approaches to trajectory planning are described in U.S. Patent Application Publication No. 2007/0179685 to Milam et al. and 2009/0132105 to Paluszek et al.

The local vertical/local horizontal (LVLH) frame of reference has often been used in modeling relative motion, with an x-direction in the local vertical or "radial" direction, the z-direction is in the direction of the orbit normal, and the y-direction forming a right hand coordinate system. If the orbit is circular, the y-direction is in the velocity, "tangential", or "alongtrack" direction.

DETAILED DESCRIPTION

I. Overview

Figure 1:
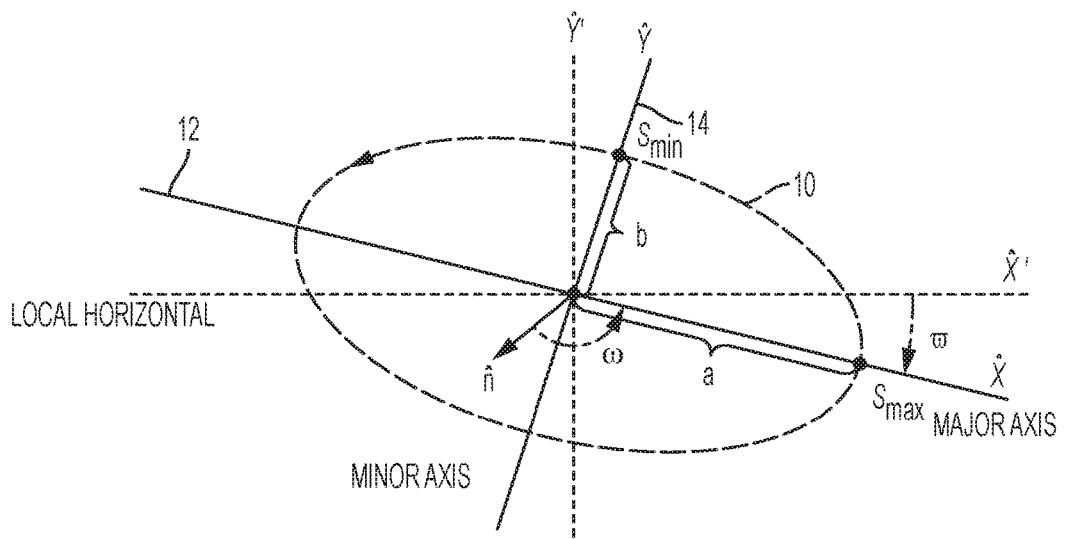
FIG. 1 illustrates relative orbital motion in the plane of the relative orbital motion.

Methods and systems are presented herein for guidance and control of spacecraft and satellites. An exemplary spacecraft or satellite includes many integrated components, including a propulsion system whose action is directed by a guidance and control system, a communication system for transmitting and receiving data, communication components, and navigational sensors and equipment. Satellite propulsion systems can be of various types, including chemical propulsion systems that use a monopropellant or a bipropellant liquid propellant, electric propulsion (EP) systems, arcjet thruster based propulsion systems, ion thruster based systems, and Hall-effect based thruster systems.

In an exemplary embodiment, the satellite or spacecraft has an onboard guidance, navigation, and control system with a space-qualified guidance and control computer dedicated to guidance, navigation, and control of satellite maneuvers or formations. The computer determines the direction and amount of thrust needed (e.g., the A v (delta-v or delta-V) vector), which represents the direction and magnitude of the required change in the spacecraft velocity which must be accomplished to move the spacecraft into the desired orbit at a specific point in time. The guidance, navigation and control system provides these thrust vector signals to the propulsion system.

The guidance, navigation and control system can apply the methods described below using an apocentral coordinate system for determining the orbital motion and the necessary set of delta-Vs needed to effect various spacecraft and satellite maneuvers. These methods can be used for many spacecraft and satellite operations, and are particularly useful for formation or cluster flight, or proximity and docking operations.

The relative orbits can be broad classes based on minimum separation distance: those for which the minimum separation distance is on the order of or less than the size of the spacecraft involved and those for which it is significantly larger. An example of the former class is an inspection vehicle that follows the contours of a larger vehicle, such as the low design impact inspection vehicle (LIIVe) discussed in Henshaw, C., Healy, L., and Roderick, S., "LIIVe: A Small, Low-Cost Autonomous Inspection Vehicle," AIAA SPACE 2009 Conference and Exposition, AIAA Paper 2009-6544, September 2009; autonomous extravehicular activity robotic camera (AERCam) discussed in Choset, H., and Kortenkamp, D., "Path Planning and Control for Free-Flying Inspection Robot in Space," Journal of Aerospace Engineering, Vol. 12, No. 2, 1999, pp. 74-81; or a servicer that grapples another vehicle for repair, such as the Phoenix program proposed in Barnhart, D., Sullivan, B., Hunter, R., Bruhn, J., Fowler, E., Hoag, L. M., Chappie, S., Henshaw, G., Kelm, B. E., Kennedy, T., Mook, M., and Vincent, K., "Phoenix Program Status-2013," AIAA SPACE 2013 Conference and Exposition, AIAA Paper 2013-5341, Sept. 2013. An example of the latter class is a cluster of small spacecraft designed for cooperative resource sharing such as System F6, in Hur-Diaz, S., and O'Connor, B., "Cluster Flight Application on System F6," 24th International Symposium on Space Flight Dynamics, May 2014. The nature of the trajectories and frequency of maneuvers will differ between these classes, but the techniques developed here are applicable to both.

In one example of a proximity operation, a larger satellite (the primary) must be inspected for damage. A smaller satellite (the secondary) can be housed at a docking station onboard the primary, and when inspection is required, could maneuver around the primary, transmit imagery of the primary to the primary for analysis and storage, and return to the docking station. In an exemplary method, an orbital path is determined that avoids collision with protruding parts of the primary while inspecting the primary in a fuel-efficient manner. In another example, a number of satellites are flown together in formation. In other examples, rendezvous and docking operations are accomplished. Such maneuvers and formations require precise control of position and velocity states, as well as spacecraft attitude.

The guidance, navigation, and control system's processor or processors are preferably space-rated, radiation-hardened processors tolerant to both radiation and extreme temperature cycles and long lifetimes, preferably with high reliability and redundancy, that runs flight software that applies a dynamic model of the spacecraft motion to estimate the absolute and relative spacecraft states based on navigation system inputs, determines the necessary set of delta-Vs needed to effect the desired motion according to the coordinate systems and equations shown below and the steps outlined in Tables 1-7, and outputs the thrust vector information to the propulsion system.

The guidance, navigation, and control computer uses as an input the spacecraft's position and velocity, and for proximity operations, the relative position and velocity with respect to the other spacecraft or satellite. One more or more flight GPS receivers in communication with global positioning satellites interfaces with and provide data to the guidance, navigation, and control computer. Navigational and positional information can also be received from onboard sensors, including IMUs, star trackers, and sun sensors, and incorporated into the estimate of the spacecraft states. In many instances, the guidance, navigation and control system can also receive input via communication links to Earth or other satellites or spacecraft, for example, a host satellite or other satellite be inspected.

In an exemplary formation-flying configuration, each satellite has a space-qualified onboard guidance, navigation, and control computer dedicated to guidance, navigation, and control of satellite formations.

Initial trajectory planning can be accomplished on a ground-based computer, or even on host satellite onboard computers. It may be necessary to periodically re-calculate the trajectories, in order to compensate for off-course position or to return to a previous location, e.g., to reinspect a particular portion of the host satellite. Feedback can be provided to the computer, including positional information from a communications link with a host satellite, global positioning satellites, or other information sources.

To accomplish these maneuvers, the spacecraft must make execute inertial orbital transfers in order to move in a path around a primary spacecraft for inspection or otherwise move in proximity to another satellite. In some instances, the spacecraft executes a slant change or a change in the colatitude of the sinilaterating node (defined in sections IV-B and IV-C below). Methods are disclosed in later paragraphs for determining the orbital parameters needed to effect the desired orbital transfer for these changes, and calculating the required impulsive thrust to move the secondary spacecraft to accomplish the maneuvers.

In some embodiments, the guidance and control system includes separated control systems in which one control system controls the in-track thrust to maintain periodicity, and the other control system controls the radial and cross-track thrust to maintain or change the relative orbit parameters, and thus, the geometric relative orbital elements that are defined in later paragraphs, in order to achieve or maintain desired orbital trajectories.

As will be discussed further in later paragraphs, relative motion of one satellite about another in circular orbit, where the two objects have the same semimajor axis, is periodic in the linearized approximation. A set of orbital elements, the geometric relative orbital elements, having a geometric analogy to the classical orbital elements, is defined. The relative orbit is seen to be an ellipse or circle in apocentral coordinates, analogous to perifocal coordinates in inertial motion and different from the local-vertical local-horizontal Cartesian coordinates customarily used for analysis of relative motion problems. The geometric relative orbital elements and apocentral coordinate system enable relative motion trajectory design and guidance that is simpler and more effective than analysis using Cartesian coordinates.

Additional information is found in Healy, L. M. and Henshaw, C. G., "Trajectory Guidance Using Periodic Relative Orbital Motion", Journal of Guidance, Control, and Dynamics, Vol. 38, No. 9, September 2015, the entire disclosure of which is incorporated herein in its entirety.

II. Relative Orbit Parameters

This section presents a solution to the Hill-Clohessy-Wiltshire equations that uses as coefficients the four constants of motion that govern periodic relative motion. The constants are not the Cartesian local-vertical local-horizontal (LVLH) initial conditions, but rather are newly defined relative orbit parameters.

The solution to the Hill-Clohessy-Wiltshire equations when the reference orbit (e.g., the primary's orbit) is circular with mean motion n may be expressed with a single harmonic term in each component, $$x = x_c + \kappa \sin\tau \tag{1}$$

$$y = y_c - \frac{3}{2}x_c(\tau - \tau_0) + 2\kappa\cos\tau \tag{2}$$

$$z = \kappa\eta\sin(\Xi + \tau) \tag{3}$$

$$\dot{x} = n\kappa\cos\tau \tag{4}$$

$$\dot{y} = -\frac{3}{2}nx_c - 2n\kappa\sin\tau \tag{5}$$

$$\dot{z} = n\kappa\eta\cos(\Xi + \tau) \tag{6}$$

with four constants of motion ($\Xi$, $\eta$, $\kappa$, and $x_c$) and one variable ($y_c$) with a linear time dependence, defined as $$\Xi = \arctan(nz, \dot{z}) - \arctan(-3nx - 2\dot{y}, \dot{x}) \quad (7)$$

$$\eta = \sqrt{\frac{n^2 z^2 + \dot{z}^2}{\dot{x}^2 + (3nx + 2\dot{y})^2}} \quad (8)$$

$$\kappa = \frac{1}{n}\sqrt{\dot{x}^2 + (3nx + 2\dot{y})^2} \quad (9)$$

$$x_c = 4x + \frac{2\dot{y}}{n} \quad (10)$$

$$y_c = y - \frac{2\dot{x}}{n} + \frac{3}{2}x_c(\tau - \tau_0), \quad (11)$$

and the phase angle $\tau$ $$\tau = \arctan(n(x-x_c), \dot{x}) = \arctan(-3nx - 2\dot{y}, \dot{x}) \quad (12)$$

also having a linear dependence on time, $\dot{\tau} = n$.

In these expressions the two-argument arctangent is used to insure correct quadrant. The relative position vector is described in the LVLH frame, $\rho = x\hat{i} + y\hat{j} + z\hat{k}$ with the radial direction ($\hat{i}$ axis, with component x), the along-track direction perpendicular to the radial along the direction of motion and in the fundamental plane ($\hat{j}$ axis, with component y), and the cross-track direction parallel to the angular momentum and normal to the fundamental plane ($\hat{k}$ axis, with component z) completing a right-hand coordinate system. The constant $\tau_0$ is defined as the value of $\tau$ when t=0, so $\tau = \tau_0 + nt$. Eqs. (1)-(11) above are solutions to the Hill-Clohessy-Wiltshire equations.

The five quantities defined in Eqs. (7)-(11) are the relative orbit parameters. The first, $\Xi$, is the phase difference, an angle, and is the difference between the phase angles in the $\hat{k}$ direction and in the $\hat{i}$-$\hat{j}$ plane. The second, $\eta$, the amplitude ratio, is the ratio of the amplitudes of the cross-track and in-plane motion, the latter amplitude measured by the scale $\kappa$, which is the semiminor axis of the 2:1 moving ellipse that is the figure of motion projected in the fundamental plane. The $x_c$ and $y_c$ are the geometric "center" of the relative orbit, which will be defined in the next section.

Lovell, T. A., and Tragesser, S., in "Guidance for Relative Motion of Low Earth Orbit Spacecraft Based on Relative Orbit Elements," AIAA/AAS Astrodynamics Specialist Conference and Exhibit, AIAA Paper 2004-4988, August 2004, define a set of constants of the motion, which they call "relative orbit elements."

In this patent application, the term "parameters" is used, so as to reserve the "elements" designation for the geometric relative orbital elements, discussed below, that have a geometric analogy to the classical elements. The Lovell and Tragesser relative orbit elements correspond to the relative orbital parameters here as $x_d = x_c$, $y_d = y_c$ when $\tau = 0$, $\alpha_e = 2\kappa$, $\beta = \tau - \pi/2$, and $\psi = \Xi + \tau$. If the two objects have the same semimajor axis, the eccentricity difference of Montenbruck et al. multiplied by the length of that semimajor axis is the constant of motion that is herein called the scale $\kappa$.

If $x_c = 0$ [or equivalently $\dot{y} = -2nx$, Eq. (7)], the motion is periodic, meaning that the figure is closed, returning to the relative position after one orbital period of the primary. These solutions, despite having a whole category of motion foreclosed, can still provide a wide range of relative orbits about the primary. The following analysis applies also for motion relative to the moving center when $x_c \neq 0$.

For periodic motion with $x_c = 0$, four relative orbit parameters, constants of the motion, are derived from Equations (7)-(10) as:

$$\Xi = \arctan(nz, \dot{z}) - \arctan(nx, \dot{x}) \quad (13)$$

$$\eta = \sqrt{\frac{n^2 z^2 + \dot{z}^2}{n^2 x^2 + \dot{x}^2}} \quad (14)$$

$$\kappa = \frac{1}{n}\sqrt{n^2 x^2 + \dot{x}^2} \quad (15)$$

$$y_c = y - \frac{2\dot{x}}{n}. \quad (16)$$

The relative orbit parameters can be classified geometrically as follows. The first pair, $\Xi$ and $\eta$ describe the three-dimensional shape and orientation of the figure. The third, $\kappa$, defines its overall scale (size). The last, $y_c$, describes the offset in the in-track direction, with a value of zero putting the center at the in-track location of the primary.

The remaining discussion assumes that the motion is periodic so $x_c = 0$, and analyzes the figure that is traced out by this motion. Almost all the quantities used depend only on amplitude ratio $\eta$ and phase difference $\Xi$; the scale $\kappa$ only multiplies two dimensionless quantities to give the overall size of the figure, and the offset $y_c$ is only used to compute the in-track displacement of the whole figure.

III. Apocentral Coordinates and Transformation

Periodic relative motion about a circular orbit in three dimensions is an ellipse 10 or circle which lies in the relative-orbit plane, as seen in FIG. 1. The "apocentral coordinate system" is defined as having its origin at the center of the ellipse, with the axis orientation set by the ellipse major and minor axes 12 and 14 as seen in FIG. 1. The third axis is normal to the relative-orbit plane, and the first two axes will lie in the relative-orbit plane with the first axis along the apse line. These axes depend only on phase difference $\Xi$ and amplitude ratio $\eta$. The system is named an "apocentral coordinate system" by analogy with the perifocal coordinate system of inertial orbital mechanics; here, the primary axis is defined by one of the two opposite directions that are the furthest distance from the primary, instead of periapsis, with the distance measured from the center, rather than the focus.

To give better definition to the concept of the center, consider it in "centered LVLH" or "cLVLH", which are parallel to the LVLH coordinates but whose origin is the center with position and velocity $\rho_c$, $\dot{\rho}_c$:

$$\rho_c = \begin{bmatrix} x_c \\ y_c - \frac{3}{2}ntx_c \\ 0 \end{bmatrix}_{LVLH}, \quad \dot{\rho}_c = \begin{bmatrix} 0 \\ -\frac{3}{2}nx_c \\ 0 \end{bmatrix}_{LVLH}. \quad (17)$$

The center is not necessarily the location of the primary; this point moves in-track as a linear function of time when $x_c \neq 0$ (non-periodic motion). The positions of the secondary relative to this center is given by $$s = \rho - \rho_c = \kappa \begin{bmatrix} \sin\tau \\ 2\cos\tau \\ \eta\sin(\Xi + \tau) \end{bmatrix}_{cLVLH} \quad (18)$$

The velocity $\dot{s}$ relative to this center is $$\dot{s} = \dot{p} - \dot{p}_c = n\kappa \begin{bmatrix} \cos\tau \\ -2\sin\tau \\ \eta\cos(\Xi + \tau) \end{bmatrix}_{cLVLH}, \quad (19)$$

from Eqs. (1)-(6). The 2:1 relative orbital ellipse projected in the fundamental plane is evident in the first two components of Eq. (18).

An apocentral coordinate system is defined based on the three-dimensional relative motion ellipse shown in FIG. 1, which shows relative orbital motion in its own plane. The first two axes of the apocentral coordinates describe the relative-orbit plane; the third axis $\hat{Z}$ is defined by the oriented plane normal, found by taking the cross product of s and $\dot{s}$. The first axis $\hat{X}$, in the plane, is the direction of the maximum excursion of the secondary in the half-plane with y≥0. The second axis $\hat{Y}$ is determined so that the set form a right-hand coordinate system, and point in a direction of minimum distance from the center.

The transformation matrix from apocentral coordinates to cLVLH coordinates is formed from each of the three coordinate unit vectors in equation (20) as $$R = \begin{bmatrix} \frac{X\sin\varpi}{Z} & \frac{X\cos\varpi}{Z} & \frac{2\eta\cos\Xi}{Z} \\ \frac{2\cos\varpi}{X} - \frac{\eta^2\sin2\Xi\sin\varpi}{XZ} & -\frac{2\sin\varpi}{X} - \frac{\eta^2\sin2\Xi\cos\varpi}{XZ} & \frac{\eta\sin\Xi}{Z} \\ \frac{4\eta\cos\Xi\sin\varpi}{XZ} + \frac{\eta\sin\Xi\cos\varpi}{X} & \frac{4\eta\cos\Xi\cos\varpi}{XZ} - \frac{\eta\sin\Xi\sin\varpi}{X} & -\frac{2}{Z} \end{bmatrix}, \quad (20)$$

with $$X = \sqrt{4 + \eta^2\sin^2\Xi} \quad (21)$$

$$Z = 4 + \eta^2(1 + 3\cos^2\Xi), \quad (22)$$

$$\varpi = \arctan\left(\frac{Z\sin\tau_a}{X^2\cos\tau_a + \eta^2\sin\Xi\cos\Xi\sin\tau_a}\right), \text{ and} \quad (23)$$

$$\tau_a = \begin{cases} \tau_{ext} & \text{if } \eta^2\cos2(\Xi + \tau_{ext}) \le 3\cos2\tau_{ext}, \\ \tau_{ext} + \frac{\pi}{2} & \text{otherwise,} \end{cases} \quad (24)$$

$$\tau_{ext} = \frac{1}{2}\arctan(\eta^2\sin2\Xi, 3 - \eta^2\cos2\Xi). \quad (25)$$

In the apocentral coordinates, the secondary is seen to move on an ellipse at a uniform angular rate; the cLVLH coordinate factor in Eq. (18) can be transformed $$\begin{bmatrix} \sin\tau \\ 2\cos\tau \\ \eta\sin(\Xi+\tau) \end{bmatrix}_{cLVLH} \overset{R^T}{\underset{R}{\rightleftharpoons}} \begin{bmatrix} a\cos c \\ b\sin c \\ 0 \end{bmatrix}_{apoc}, \quad (26)$$

with c=τ−$\tau_a$ being the central anomaly and a and b being the lengths of the semimajor axis and the semiminor axis, respectively, as illustrated in FIG. 1.

The symbol "$\rightleftharpoons$" indicates that the forms on the left and right of equation (26) can be obtained from the other using the transformation indicated. The velocity factor in Eq. (19) is also transformed as $$\begin{bmatrix} \cos\tau \\ -2\sin\tau \\ \eta\cos(\Xi+\tau) \end{bmatrix}_{cLVLH} \overset{R^T}{\underset{R}{\rightleftharpoons}} \begin{bmatrix} -a\sin c \\ b\cos c \\ 0 \end{bmatrix}_{apoc}. \quad (27)$$

All the constants depend only on η and Ξ except a and b, which are also proportional to the scale κ.

IV. Geometric Relative Orbital Elements (GROE)

The relative orbital motion of a secondary about a primary in a circular orbit is described with geometric relative orbital elements, which are directly analogous to inertial (conventional) orbital elements in their geometric qualities. They are the semimajor axis a, eccentricity e, central anomaly c, slant σ, colatitude of the sinilaterating node Γ, and argument of apocenter w. Table 1 summarizes the geometric relative orbital elements and their analogue elements. They are parameterized by the shape and orientation parameters η and Ξ, except for the semimajor axis, which is proportional to the scale κ as well. As with classical classical orbital elements, the geometric relative orbital elements can be divided into two categories: the three a, e, c that describe motion in the plane and the three σ, Γ, w that give the orientation (three-dimensional rotation) of the plane in space.

TABLE 1

The Geometric Relative Orbital Elements

| Name | Symbol | Analogue |
|---|---|---|
| Semimajor axis | a | Semimajor axis |
| Eccentricity | e | Eccentricity |
| Central anomaly | c | Mean anomaly |
| Slant | σ | Inclination |
| Colatitude of the sinilaterating node | γ | Right ascension of the ascending node |
| Argument of apocenter | w | Argument of periapsis |

A. Motion in the Relative-Orbit Plane

The "scaled semimajor axis", A, is a dimensionless quantity ($A \geq 2$) that is computed from the first component of the apocentral position vector [Eq. (18)] when $\tau = \tau_a$, $$A = \frac{1}{X}([4\cos\tau_a + \eta^2 \sin\Xi \sin(\Xi + \tau_a)]\cos\varpi + Z\sin\tau_a \sin\varpi), \quad (28)$$

and similarly the "scaled semiminor axis", B, has a value $1 \leq B \leq 2$ and is computed from the second component of the apocentral position vector when $\tau = \tau_a + \pi/2$, $$B = \frac{1}{X}([4\sin\tau_a - \eta^2 \sin\Xi \cos(\Xi + \tau_a)]\sin\varpi + Z\cos\tau_a \cos\varpi). \quad (29)$$

The lengths of the semimajor axis a and the semiminor axis b are determined by multiplying the scaled semimajor axis A and scaled semiminor axis B, respectively, by the scale factor $\kappa$ ($a = \kappa A$ and $b = \kappa B$). Computing the apocentral coordinates of s for any parameters $\eta$, $\Xi$, and central anomaly c will show that the first two components of s satisfy the ellipse equation $$\left(\frac{s \cdot \hat{X}}{a}\right)^2 + \left(\frac{s \cdot \hat{Y}}{b}\right)^2 = 1 \quad (30)$$

and that the third component is zero ($s \cdot \hat{Z} = 0$) (see FIG. 3), as asserted in Lovell and Tragesser.

The eccentricity of the ellipse is computed as $$e = \sqrt{1 - \left(\frac{B}{A}\right)^2}. \quad (31)$$

Any two of the three a, b, and e form an independent set of elements. Note that for the classical orbital element set, a and e can be chosen as the standard elements and b can be defined as $b = a\sqrt{1-e^2}$.

The third element describing in-plane motion is the central anomaly, $c = \tau - \tau_a$. It is a linear function of time because $\tau$ is a linear function of time ($\dot{\xi} = n$), and $\tau_a$ is a constant of the motion, so that $\dot{c} = n$.

The value of the central anomaly as a function of the geometric angle $\theta$ from X to the satellite in the apocentral plane is given by $$c = \arctan\left(\frac{A}{B}\tan\theta\right). \quad (32)$$

This geometric angle $\theta$ is the analogue of true anomaly. This equation is considerably simpler to solve than the relation between mean and true anomaly because no transcendental equation (e.g., Kepler's) is involved.

Table 2 summarizes the steps for determining or computing the scaled semimajor axis $A = a/\kappa$ and the scaled semiminor axis $B = a\sqrt{1-e^2}/\kappa$, given the relative orbit parameters. The function "step" is zero for negative and zero arguments, and one for positive arguments. The rotation matrix R is computed with Eq. (20).

TABLE 2

Computation of A, B, and R from $\eta$ and $\Xi$

| Find | Using | Computation | Eq. |
| --- | --- | --- | --- |
| X | $\eta$, $\Xi$ | $\sqrt{4 + \eta^2 \sin^2 \Xi}$ | (21) |
| Z | $\eta$, $\Xi$ | $\sqrt{4 + \eta^2 (1 + 3\cos^2 \Xi)}$ | (22) |
| $\tau_{ext}$ | $\eta$, $\Xi$ | $\frac{1}{2} \arctan(\eta^2 \sin 2\Xi, 3 - \eta^2 \cos 2\Xi)$ | (25) |
| $\tau_a$ | $\tau_{ext}$, $\eta$, $\Xi$ | $\tau_{ext} + \text{step}(\eta^2 \cos 2(\Xi + \tau_{ext}) - 3 \cos 2\tau_{ext})\frac{\pi}{2}$ | (24) |
| $\varpi$ | $\tau_a$, X, Z, $\eta$, $\Xi$ | $\arctan\left(\frac{Z \sin \tau_a}{X^2 \cos \tau_a + \eta^2 \sin \Xi \cos \Xi \sin \tau_a}\right)$ | (23) |
| A | $\varpi$, $\tau_a$, X, Z, $\eta$, $\Xi$ | $\frac{1}{X}([4 \cos \tau_a + \eta^2 \sin \Xi \sin(\Xi + \tau_a)]\cos \varpi + Z \sin \tau_a \sin \varpi)$ | (28) |
| B | $\varpi$, $\tau_a$, X, Z, $\eta$, $\Xi$ | $\frac{1}{X}([4 \sin \tau_a - \eta^2 \sin \Xi \cos(\Xi + \tau_a)]\sin \varpi + Z \cos \tau_a \cos \varpi)$ | (29) |
| R | $\varpi$, X, Z, $\eta$, $\Xi$ | See equation (20) | (20) |

B. Slant

The first of the three-dimensional rotation elements is the "slant", $\sigma$, the oriented dihedral angle from the fundamental plane to the relative-orbit plane, or the angle from the cross-track direction $\hat{k}$ to the normal formed from the third column in Eq. (20), $$\sigma = \arccos\left(-\frac{2}{Z}\right). \tag{33}$$

Figure 2:
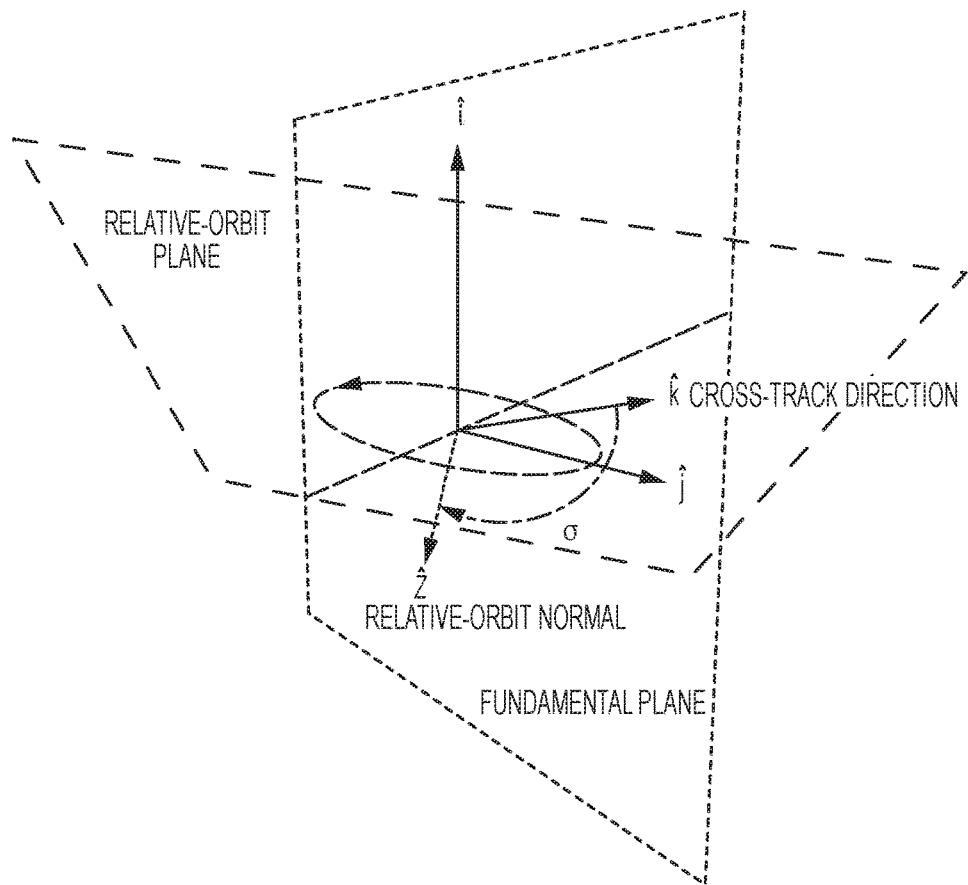
FIG. 2 is a perspective view of slant, one of three three-dimensional rotation elements that describe the orientation of the relative orbital plane in space.

The slant $\sigma$ of a relative orbit is illustrated in FIG. 2. It is the analogue of inclination and takes a value in the second quadrant of $\pi/2 \leq \arctan(-\eta/2) \leq \sigma \leq \arctan(-\eta) < \pi$. These inequalities can be shown by substitution of the value of Z from Eq. (22) for its minimum and maximum values over $\Xi$. The slant is always in the second quadrant because the oriented normal of the relative-orbit plane is opposite $(-\hat{k})$ to that of the fundamental plane normal (using a right hand rule). In the analogy, this is known as a retrograde orbit. Thus, the slant has a tangent (and cosine) that is always negative.

When viewing the two orbits by the differences of their orbital elements, the slant is a combination of the difference in inclination and right ascension of the ascending node, which depends on the inclination of the primary. See, for example, Schaub, H., "Relative Orbit Geometry Through Classical Orbit Element Differences," Journal of Guidance, Control, and Dynamics, Vol. 27, No. 5, 2004, pp. 839 - 848. For an equatorial primary orbit, slant is the supplement of relative inclination; for a polar orbit, it is the supplement of relative right ascension of the ascending node. Schaub's "tilt angle" $\delta_w$ is the supplement of the slant, and Schaub's Eq. (42) uses spherical trigonometry to show the tilt angle's dependence on the inclination and right ascension of the ascending node differences. Montenbruck et al. label this angle as $\delta i$ though it is not a difference of inclinations (compare Montenbruck et al. FIG. 2 and Schaub FIG. 2). See Montenbruck, O., Kirschner, M., and D'Amico, S., E-/I-Vector Separation for GRACE Proximity Operations, DLR/German Space Operations Center TN 04-08, 2004. Yao, Y., Xie, R., and He, F., "Flyaround Orbit Design for Autonomous Rendezvous Based on Relative Orbit Elements," Journal of Guidance, Control, and Dynamics, Vol. 33, No. 5, 2010, pp. 1687-1692, calls it the "relative inclination angle."

C. Colatitude of the Sinilaterating Node

The line of nodes defined by the intersection of the fundamental plane and the relative-orbit plane has two directions from the center. The "sinilaterating node" direction $\hat{n}$ is the one for which the secondary moves from the $-\hat{k}$ side of the fundamental plane to the $+\hat{k}$ side (right to left, when facing in the velocity direction $+\hat{j}$). It is the direction determined by the cross product of the cross-track direction and the relative-orbit plane normal, the third column in Eq. (20), $$\hat{n} \propto \begin{bmatrix} -\sin\Xi \\ 2\cos\Xi \\ 0 \end{bmatrix}_{cLVLH}; \tag{34}$$

with the normalizing scalar removed because it does not affect the direction determination.

Figure 3:
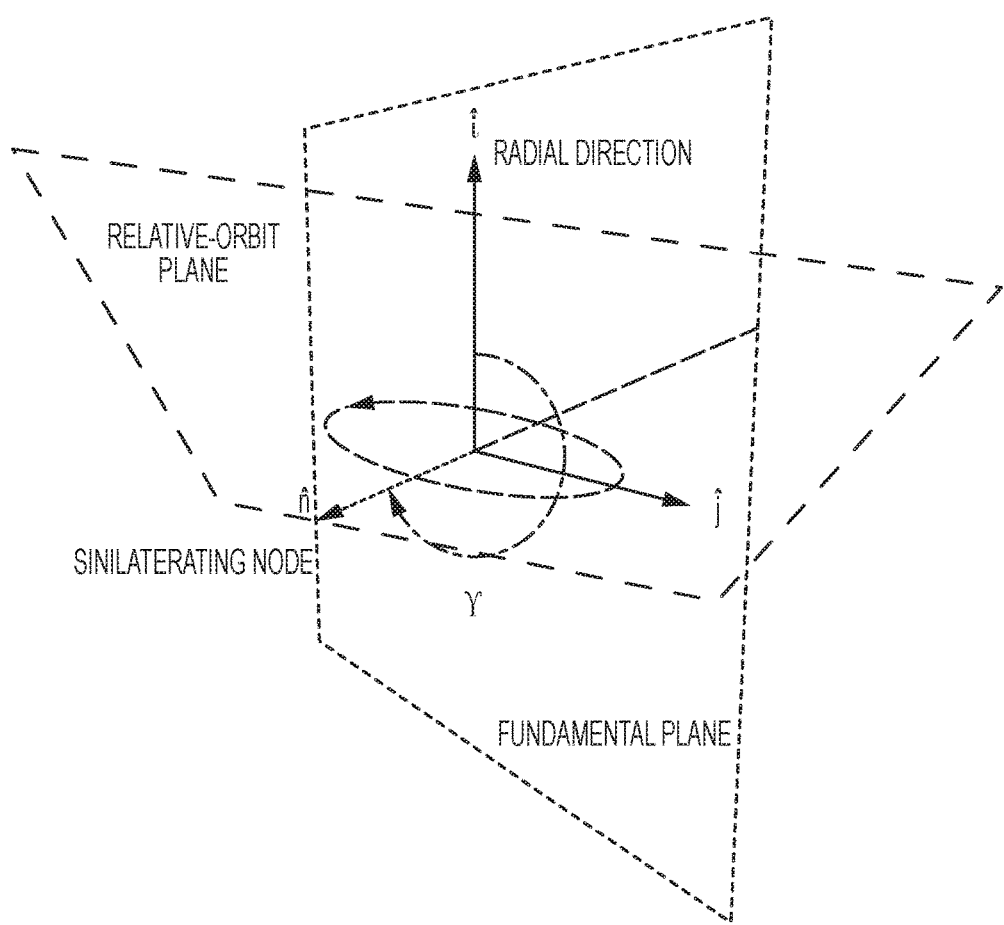
FIG. 3 is a perspective illustration of the colatitude of the sinilaterating node, another of three three-dimensional rotation elements that describe the orientation of the relative orbital plane in space.

The "colatitude of the sinilaterating node" $\Gamma$ is the angle between the local vertical ($\hat{i}$ direction) and the sinilaterating node direction $\hat{n}$ of Eq. (34), $$\Gamma = \arctan(2\cos\Xi, -\sin\Xi); n \tag{35}$$

as seen in FIG. 3. The angle $\Gamma$ takes on values over the full circle $-\pi \leq \Gamma < \pi$. It is the analogue of right ascension of the ascending node, and is a function of only the phase difference $\Xi$.

D. Argument of Apocenter

The "argument of apocenter" w, defined as the angle from the node to $\hat{X}$, is the sum of the angle from the node to the local horizontal, $\arctan(Z \sin \Xi, 4 \cos \Xi)$, and $\bar{\omega}$ [Eq. (23)], the angle from the horizontal to the apocenter direction X, $$w = \bar{\omega} + \arctan(Z \sin \Xi, 4 \cos \Xi). \tag{36}$$

FIG. 3, which shows a relative orbit with $\eta = 2$, $\Xi = 137.5$ deg, shows the sinilaterating node direction $\hat{n}$ and argument of apocenter w approximately equal to 122.4 deg. The argument of apocenter is the analogue of the argument of periapsis. Both the argument of apocenter w and the $\bar{\omega}$ are undefined if the relative motion is circular (e.g., if eccentricity e=0).

E. Computing Relative Orbit Parameters from Geometric Relative Orbital Elements The relative orbit parameters can be computed from the geometric relative orbital elements. The phase difference $\Xi$ is computed from the colatitude of the sinilaterating node as $$\Xi = \arctan(-2 \cos \Gamma, \sin \Gamma). \tag{37}$$

The relative amplitude $\eta$ is computed from the colatitude of the sinilaterating node and the slant, $$\eta = -\frac{2\tan\sigma}{\sqrt{1 + 3\cos^2\Xi}} = -\sqrt{1 + 3\cos^2\Gamma} \tan\sigma, \tag{38}$$

with relative amplitude limited to a range of $$0 \leq -\tan \sigma \leq \eta \leq -2 \tan \sigma. \tag{39}$$

Thus, the other elements may be considered to be functions of the two elements $\Gamma$ and $\sigma$ rather than $\Xi$ and $\eta$.

V. Evolution of Relative Orbits

In LVLH coordinates, the secondary in periodic motion has position $\rho$ and velocity $\dot{\rho}$ as a function of time that are given by $$\rho = \rho_c + R \begin{bmatrix} a\cos(c_0 + nt) \\ b\sin(c_0 + nt) \\ 0 \end{bmatrix}_{apoc} \tag{40}$$

$$\dot{\rho} = nR \begin{bmatrix} -a\sin(c_0 + nt) \\ b\cos(c_0 + nt) \\ 0 \end{bmatrix}_{apoc}, \tag{41}$$

where $c_0$ is the value of the central anomaly at $t=0$. Note that the harmonic terms in apocentral coordinates are linear functions of time through c, so there is no need to solve Kepler's equation as there is for inertial motion.

The central anomaly c is proportional to the time elapsed after the secondary passes the major axis or apse; the constant of proportionality is the primary mean motion n. If the location of the secondary $\rho$ is known, along with $a = \kappa A$, b=κB, R and $y_c$, the central anomaly c may be computed. This computation uses the displacement from the center with the first two components $\bar{x}$, $\bar{y}$ of s=ρ−$ρ_c$, $$\bar{s} = R^T(\rho - \rho_c) = \begin{bmatrix} a\cos c \\ b\sin c \\ 0 \end{bmatrix}_{apoc}. \qquad (42)$$

The central anomaly c is then computed as $$c = \arctan(A\bar{y}, B\bar{x}). \qquad (43)$$

With a known central anomaly c at a point and a, b, and R known as well, the velocity $\dot{\rho}$ at that point is computed as $$\dot{\rho} = nR \begin{bmatrix} -a\sin c \\ b\cos c \\ 0 \end{bmatrix}_{apoc}. \qquad (44)$$

Table 3 shows a sequence of steps for computing the relative velocity $\dot{\rho}$ from the relative position ρ, the location of the center $ρ_c$, the scale κ, A, B, and R.

TABLE 3

| | Velocity $\dot{\rho}$ and central anomaly c from location ρ | | |
|---|---|---|---|
| Find | Using | Computation | Eq. |
| $ρ_c$ | $y_c$ | $[0, y_c, 0]^T$ | (17) |
| $\bar{x}, \bar{y}$ | R, ρ, $ρ_c$ | (ρ − $ρ_c$) (first two components) | (42) |
| c | A, B, $\bar{x}, \bar{y}$ | $\arctan(A\bar{y}, B\bar{x})$ | (43) |
| $\dot{\rho}$ | R, A, B, κ, c | $n[-κA \sin c, κB \cos c, 0]^T$ | (44) |

The time elapsed for the secondary to travel between the points can be determined based on the difference in phase and the mean motion of the primary as $$\Delta t = \frac{c_1 - c_0}{n}. \qquad (45)$$

For this formula to produce the correct result, the central anomaly should be computed so that it does not decrease with time ($c_1 > c_0$ if $t_1 > t_0$). This means that it may be necessary to add or subtract multiples of 2π to one or both of these. Because the motion is periodic, additional integer multiples of the orbital period can be added to Δt.

VI. Impulsive Maneuver Delta-V

To accomplish an impulsive maneuver, the delta-V (or Δv) vector required at a point of impulsive maneuver is computed as the difference in the velocity at the end of the prior orbital segment and the velocity at the start of the following orbital segment. If the orbit is to have the same semimajor axis and thus preserve periodicity, the vector difference will have components only in the radial and cross-track directions. A delta-V in the in-track direction ĵ would change $x_c$ and induce a drift, resulting in motion that is not periodic. All the algorithms presented herein produce periodic solutions by design. Working in apocentral coordinates in which the motion is manifestly periodic ensures that when the solution is transformed to LVLH coordinates, it is also periodic.

From Eqs. (13)-(16), it can be seen that a change in the cross-track velocity ←$\dot{z}$ changes Ξ and η but not κ and $y_c$. On the other hand, a radial maneuver Δ$\dot{x}$ will change all four relative orbit parameters. That means that the center and scale will change, but in a transfer with two or more impulsive maneuvers, a change of one or more parameters from the first maneuver can be undone by the second, as will be shown below under the heading Colatitude of the Sinilaterating Node, where κ is changed but not the other parameters.

There is a simple linear relationship between a radial velocity maneuver and a change in $y_c$. From Eqs. (3) with $x_c$=0, the radial velocity is $$\dot{x} = n\frac{y - y_c}{2}, \qquad (46)$$

with n being the mean motion of the primary. Therefore, the radial delta-V is related to the change in offset $\Delta y_c = y'_c - y_c$, $$\Delta \dot{x} = 1/2n(y_c^+ - y_c^-) = 1/2n\Delta y_c, \qquad (47)$$

with the value of quantities just before the maneuver indicated with a superscript "−" and those just after with a superscript "+." This change in the offset $y_c$ [Eq. (53)] repositions the center and the ellipse forward or backward along the direction of motion.

Desired periodic trajectories can be achieved or maintained with a separated control system in which one control system controls the in-track thrust to maintain periodicity, and the other control system controls the radial and cross-track thrust to maintain or change the relative orbit parameters, and thus, the geometric relative orbital elements.

VII. Slant Change

One simple inertial orbit transfer is a plane change with only one element (inclination or right ascension of the ascending node) changed. If performed at the intersection of the initial and final plane, this may be carried out in a single impulsive maneuver.

An inclination change performed at either the ascending or descending node can be computed. Vallado, D. A., and McClain, W. D., Fundamentals of Astrodynamics and Applications, Kluwer Academic, pp. 328-331 provides some information related to such an inclination change. The other orbital elements are kept the same, and the velocity vector diagram is an isosceles triangle from which the delta-V can be derived.

For geometric relative orbital elements, the analogue of inclination is slant, and a plane change can be effected at the sinilaterating node. The dependence of the other geometric relative orbital elements on slant, however, means that other elements must also change, so the relative delta-V is derived differently.

The computation steps for a change of slant Δσ with an impulsive maneuver at the sinilaterating node are described in Table 4. It is assumed that some epoch time, the relative position $ρ_0$ and velocity $\dot{ρ}_0$ are known in LVLH Cartesian coordinates. From these values, the maneuver location ρ and velocity prior to the maneuver $\dot{ρ}^−$ are computed using Tables 2 and 3. The desired change in slant Δσ is added to the slant prior to the maneuver $σ^−$ to get the slant after the maneuver $σ^+$. The resultant velocity vector $\dot{ρ}^−$ just after the maneuver is computed, again using Tables 2 and 3. The delta-V is found by subtracting $\dot{ρ}^−$.

The maneuver point is chosen so that the location of the secondary is on the sinilaterating node. The geometric angle $\theta$ in the apocentral plane is related to the central anomaly by tangents [see Eq. (32)]. On the sinilaterating node, $\theta$ is the negative of the argument of apocenter, $\theta = -w$, and this relation gives the central anomaly prior to the maneuver $c^-$, $$c^- = \arctan\left[\frac{A}{B}\tan(-w)\right]. \quad (48)$$

Figure 4:
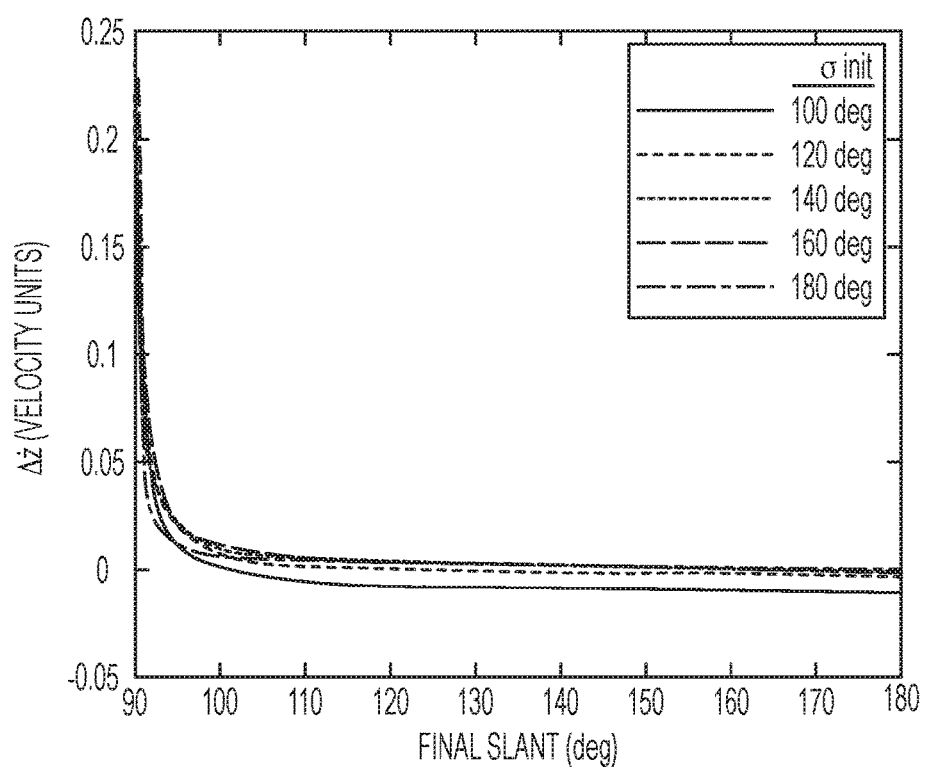
FIG. 4 is a plot of the cross track component ($\Delta \dot{z}$) of the impulsive velocity change (delta-v) needed move from an initial relative orbit into a final relative orbit with a final slant σ for several values of the initial slant $\sigma_{init}$.

The central anomaly at epoch $c_0$ is computed using Table 3. Time elapsed past epoch at which to perform the maneuver $\Delta t$ is the difference of these two values divided by the mean motion n. If it comes out negative, an integer number of orbital periods must be added, indicated by an integer m in Table 4. With the complete relative orbital state known, it may be propagated, or converted to geometric relative orbital elements to determine how much the other elements changed. FIG. 4 is a plot of delta-V by final slant value for a set of five initial slant values. The velocity units are non-dimensional units determined by the mean motion.

TABLE 4

Computation of maneuver $\Delta\dot{\rho}$, $\Delta t$ for slant-only change $\Delta\sigma$

| Find | Using | Computation | Eq. |
|---|---|---|---|
| $\kappa$, $y_c$, $\eta^-$, $\Xi^-$ | $\rho_0$, $\dot{\rho}_0$ | | (3) |
| $Z^-$, $R^-$, $A^-$, $B^-$, $\overline{\omega}^-$ | $\eta^-$, $\Xi^-$ | See Table 2 | |
| $\rho_c$ | $y_c$ | $[0, y_c, 0]^T$ | (17) |
| $c_0$ | $R^-$, $\rho_0$, $\rho_c$ | See Table 3 | |
| $\sigma^-$ | $Z^-$ | $\arccos(-2/Z^-)$ | (33) |
| $w^-$ | $\overline{\omega}^-$, $Z^-$, $\Xi$ | $\overline{\omega}^- + \arctan(Z^-\sin\Xi, 4\cos\Xi)$ | (36) |
| $c^-$ | $w$, $A^-$, $B^-$ | $\arctan[A^-\tan(-w^-)/B^-]$ | (48) |
| $\rho$ | $c^-$, $A^-$, $B^-$, $R^-$, $\kappa$, $\rho_c$ | $\rho_c + R^-[\kappa A^-\cos c^-, \kappa B^-\sin c^-, 0]^T$ | (42) |
| $\dot{\rho}^-$ | $c^-$, $A^-$, $B^-$, $R^-$, $\kappa$ | $nR^-[-\kappa A^-\sin c^-, 2B^-\cos c^-, 0]$ | (44) |
| $\sigma^+$ | $\sigma^-$, $\Delta\sigma$ | $\sigma^- + \Delta\sigma$ | |
| $\eta^+$ | $\sigma^+$, $\Xi$ | $-2\tan\sigma^+/\sqrt{1+3\cos^2\Xi}$ | (38) |
| $A^+$, $B^+$, $R^+$ | $\eta^+$, $\Xi$ | See Table 2 | |
| $\dot{\rho}^+$ | $R^+$, $\rho$, $\rho_c$ | See Table 3 | |
| $\Delta\dot{\rho}$ | $\dot{\rho}^+$, $\dot{\rho}^-$ | $\dot{\rho}^+ - \dot{\rho}^-$ | |
| $\Delta t$ | $c_0$, $c^-$ | $(c^- - c_0 + 2m\pi)/n$ | (45) |

VIII. Colatitude of the Sinilaterating Node Change

TABLE 5

Computing maneuver $\Delta\dot{\rho}$, $\Delta t$ for colatitude of the sinilaterating node-only change $\Delta\gamma$

| Find | Using | Computation | Eq. |
|---|---|---|---|
| $\kappa$, $y_c$, $\eta^-$, $\Xi^-$ | $\rho_0$, $\dot{\rho}_0$ | | (3) |
| $Z^-$, $R^-$, $A^-$, $B^-$, $\overline{\omega}^-$ | $\eta^-$, $\Xi^-$ | See Table 2 | |
| $\rho_c$ | $y_c$ | $[0, y_c, 0]$ | (17) |
| $c_0$ | $R^-$, $\rho_0$, $\rho_c$ | See Table 3 | |
| $\sigma$ | $Z^-$ | $\arccos(-2/Z^-)$ | (33) |
| $\gamma^-$ | $\Xi^-$ | $\arctan(2\cos\Xi^-, -\sin\Xi^-)$ | (35) |
| $\theta$ | $\Delta\gamma$, $\sigma$ | See text | (49), (50) |

TABLE 5-continued

Computing maneuver $\Delta\dot{\rho}$, $\Delta t$ for colatitude of the sinilaterating node-only change $\Delta\gamma$

| Find | Using | Computation | Eq. |
|---|---|---|---|
| $w^-$ | $\overline{\omega}^-$, $Z^-$, $\Xi$ | $\overline{\omega}^- + \arctan(Z^-\sin\Xi^-, 4\cos\Xi^-)$ | (36) |
| $c^-$ | $w$, $A^-$, $B^-$ | $\arctan[A^-\tan(\theta - w^-)/B^-]$ | (32) |
| $\rho$ | $c^-$, $A^-$, $B^-$, $R^-$, $\kappa$, $\rho_c$ | $\rho_c + R^-[\kappa A^-\cos c^-, \kappa B^-\sin c^-, 0]^T$ | (42) |
| $\dot{\rho}^-$ | $c^-$, $A^-$, $B^-$, $R^-$, $\kappa$ | $n^-[-2A^-\sin c^-, 2B^-\cos c^-, 0]$ | (44) |
| $\gamma^+$ | $\gamma^-$, $\Delta\gamma$ | $\gamma^- + \Delta\gamma$ | |
| $\eta^+$ | $\gamma^+$, $\sigma$ | $-\sqrt{1+3\cos^2\gamma^+}\tan\sigma$ | (38) |
| $\Xi^+$ | $\gamma^+$ | $\arctan(-2\cos\gamma^+, \sin\gamma^+)$ | (37) |
| $A^+$, $B^+$, $R^+$ | $\eta^+$, $\Xi$ | See Table 2 | |
| $\dot{\rho}^+$ | $R^+$, $\rho$, $\rho_c$ | See Table 3 | |
| $\Delta\dot{\rho}$ | $\dot{\rho}^+$, $\dot{\rho}^-$ | $\dot{\rho}^+ - \dot{\rho}^-$ | |
| $\Delta t$ | $c_0$, $c^-$ | $(c^- - c_0 + 2m\pi)/n$ | (45) |

The colatitude of the sinilaterating node is the analogue of right ascension of the ascending node in inertial orbital dynamics, so the spherical trigonometry formulas from Vallado and McClain pp. 331-332 that related changing the right ascension of the ascending node at the intersection of the old and new planes can be used. The angle between the planes $\Theta$ is computed from the change in colatitude of the sinilaterating node $\Delta\Gamma$ and the slant $\sigma$, as $$\cos\Theta = \cos^2\sigma + \sin^2\sigma\cos\Delta\Gamma. \quad (49)$$

The angle $\theta$ from the node to the maneuver point is computed using the angle $\Theta$ in a supplemental cosine rule, $$\cos\theta = \text{sgn}(\Delta\Gamma)\frac{\cos\vartheta - 1}{\tan\sigma\sin\vartheta}, \quad (50)$$

valid for $-\pi < \Delta\Gamma \leq \pi$, and taking $\sin\Theta > 0$. The function "sgn" is $-1$ for negative arguments, 0 for zero argument, and $+1$ for positive arguments. The geometric angle $\theta$ can be converted into an elapsed time by means of the central anomaly; the central anomaly is computed from Eq. (32). The elapsed time is the time from the secondary crossing the fundamental plane (at the sinilaterating node) to the time of the maneuver. The steps to compute the resultant delta-V and elapsed time are very similar to that of a slant change, and are given in Table 5.

IX. Trajectory Planning of Periodic Relative Orbits

Two of the geometric relative orbital elements, the slant $\sigma$ and the colatitude of the sinilaterating node $\Gamma$, together with two of the relative orbit parameters, $\kappa$ and $y_c$, together form the design parameters for relative trajectory planning. They are a useful way of computing relative orbits, much as classical orbital elements or their variants are for inertial motion. It is possible to express the amplitude ratio $\eta$ and the phase difference $\Xi$ in terms of $\sigma$ and $\Gamma$, [Eq. (37) and Eq. (38)]. This means that all the other elements may be computed from them (with the semimajor axis also needing a factor of $\kappa$). The set of four constants of the motion $\kappa$, $y_c$, $\sigma$, $\Gamma$ are an independent set of constants that within their specified range of values for $\kappa \geq 0$, $-\infty < y_c < \infty$, $\pi/2 < \sigma \leq \pi$, $-\pi < \Gamma \leq \pi$ uniquely identify a periodic relative orbit. Each of these quantities or design parameters has a geometric interpretation that can aid the design of relative orbits.

Orbital design in a geometric periodic relative orbit system can use the design parameters κ, $y_c$, σ, and Γ. Using the geometric periodic relative orbit principles allows design constraints such as communication between spacecraft to be analyzed before being formally optimized.

A path for a single spacecraft that needs to follow a close trajectory to see all parts of another vehicle and avoid colliding with it can be designed with these constants in mind to change plane and change the size of the orbit. Any desired proximity motion can be analyzed starting with the four constants of motion parameters κ, $y_c$, σ, and Γ as the relative motion design parameters.

Even non-periodic motion can be considered with the addition of a new constant (and giving a linear time dependence to $y_c$). While the periodicity assumption bounds the problem, the general relative motion can in many cases be better solved using the geometric quantities instead of a Cartesian approach.

In summary, four constants of motion describe periodic relative motion about a circular orbit. Two of these, the phase difference Ξ and the amplitude ratio η, describe its shape and orientation in three dimensions, and two, the scale κ and in-track center $y_c$, describe its size and location. This ellipse or circle is used to define apocentral coordinates whose origin is at the center, whose first axis is aligned with the apse line, and whose third axis aligned with the normal.

Geometric relative orbital elements are defined by analogy to classical orbital elements. The first three are descriptions of the ellipse in its plane: the relative semimajor axis a, eccentricity e, and the central anomaly c. The second three describe the embedding of the relative-orbit plane in three-dimensional space as 3-1-3 Euler angles: the slant σ, the colatitude of the sinilaterating node IC, and the argument of apocenter w. All are constant except for c which increases linearly with time. They form an exact geometric analogue to classical orbital elements, but unlike those elements, all combinations of values are not possible; e, σ, Γ and w are parameterized by just two constants Ξ and η, and semimajor axis a is κ times a quantity parameterized by those quantities. However, there is a degree of freedom not present in inertial motion: the center may be displaced in-track an arbitrary amount, $y_c$.

Impulsive maneuvers to change only the slant, or only the colatitude of the sinilaterating node, or to pass through a given point (three-point periodic boundary value problem) are computed in a straightforward way. The last of these may be used to compute a relative orbit resizing transfer with two maneuvers. The delta-Vs have no in-track component, so periodicity is maintained before and after the maneuver. Using four design parameters σ, Γ, κ, and $y_c$ opens up the possibility of geometry-based relative orbit that can be executed rapidly on limited-capability flight processors.

X. Examples

Figure 5:
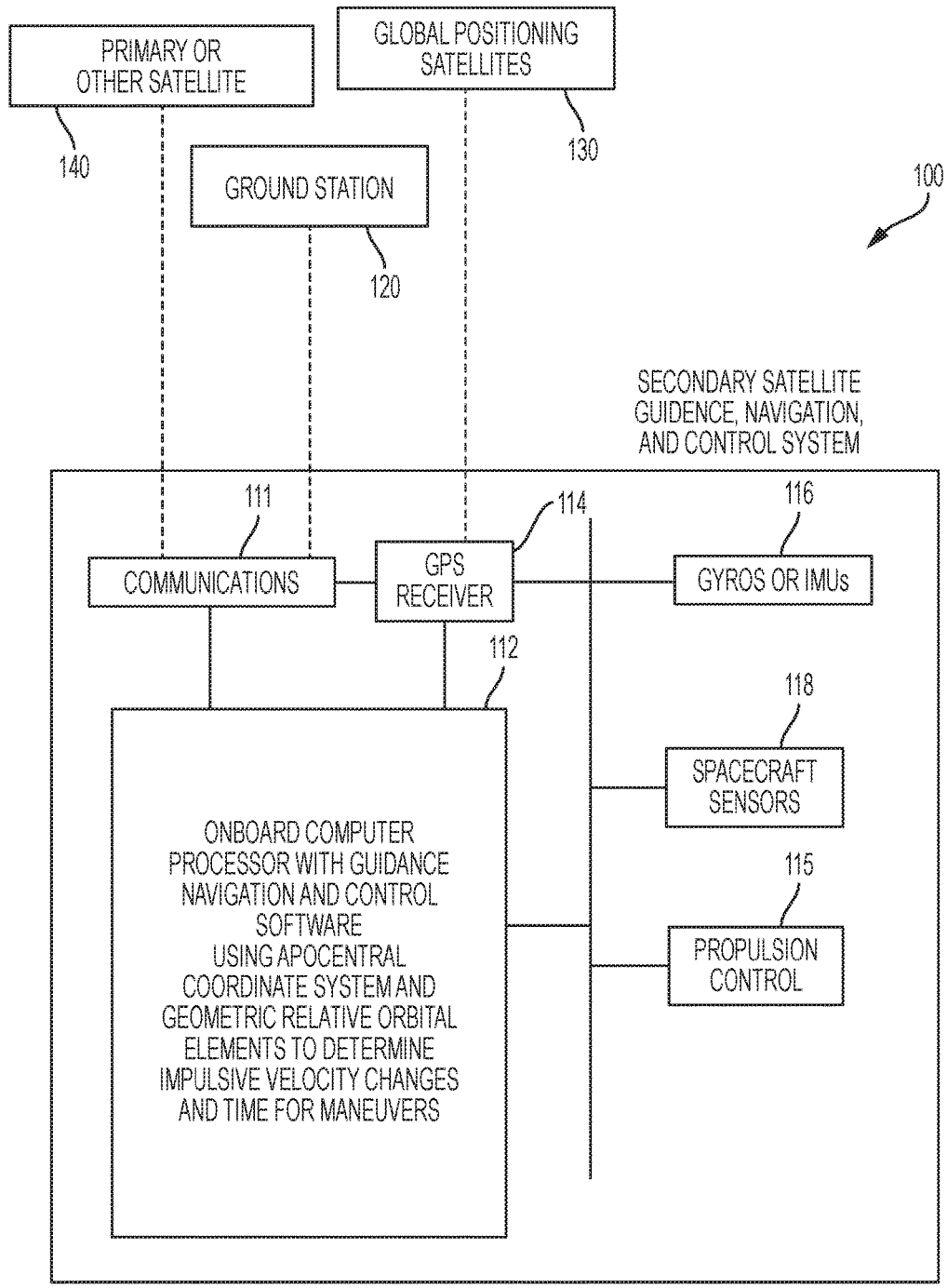
FIG. 5 illustrates an onboard guidance, navigation and control system for a secondary spacecraft.
Figure 6A:
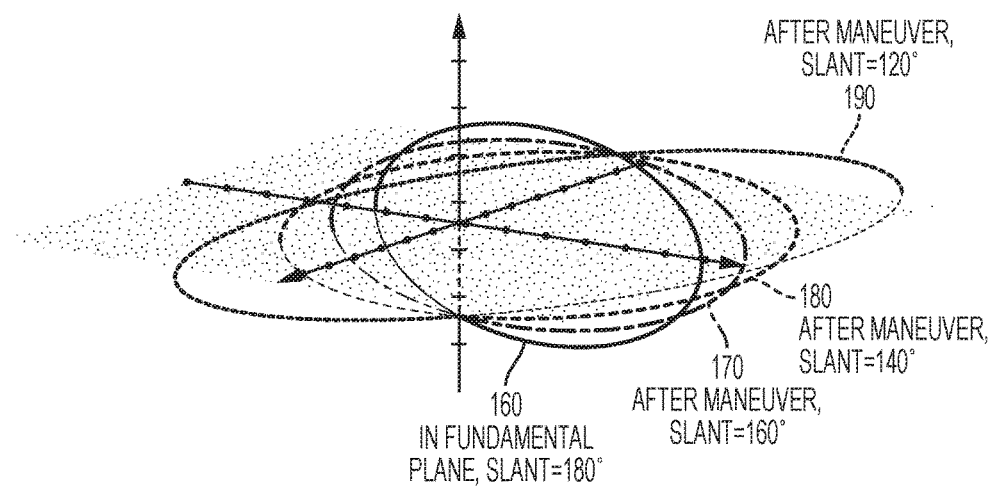
FIG. 6A-6E illustrate a maneuver to change the slant of the relative orbit of the secondary spacecraft with respect to the primary spacecraft.
Figure 6B:
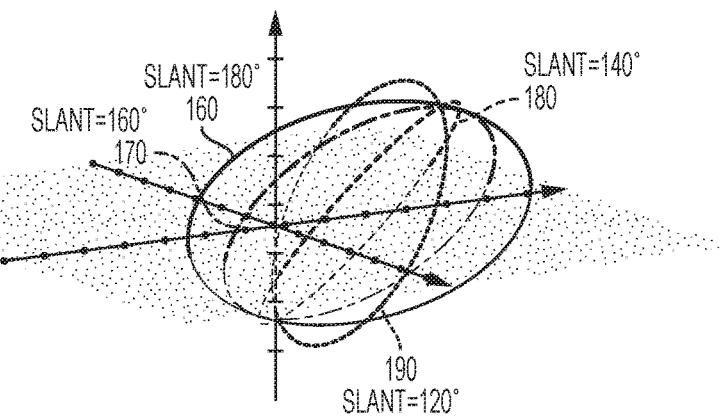
Figure 6C:
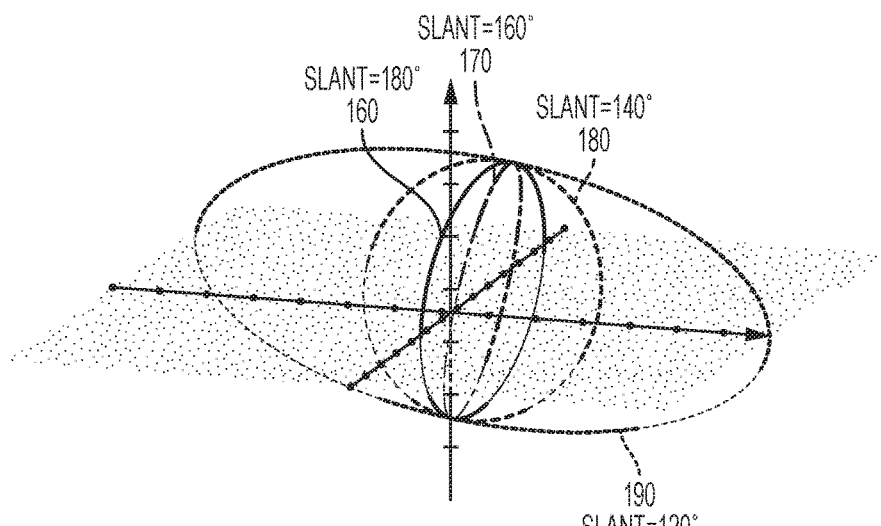
Figure 6D:
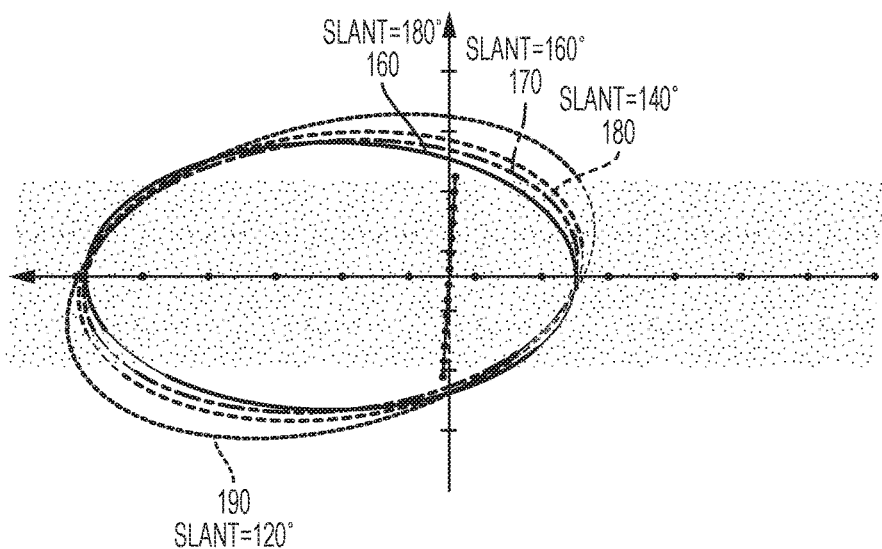
Figure 6E:
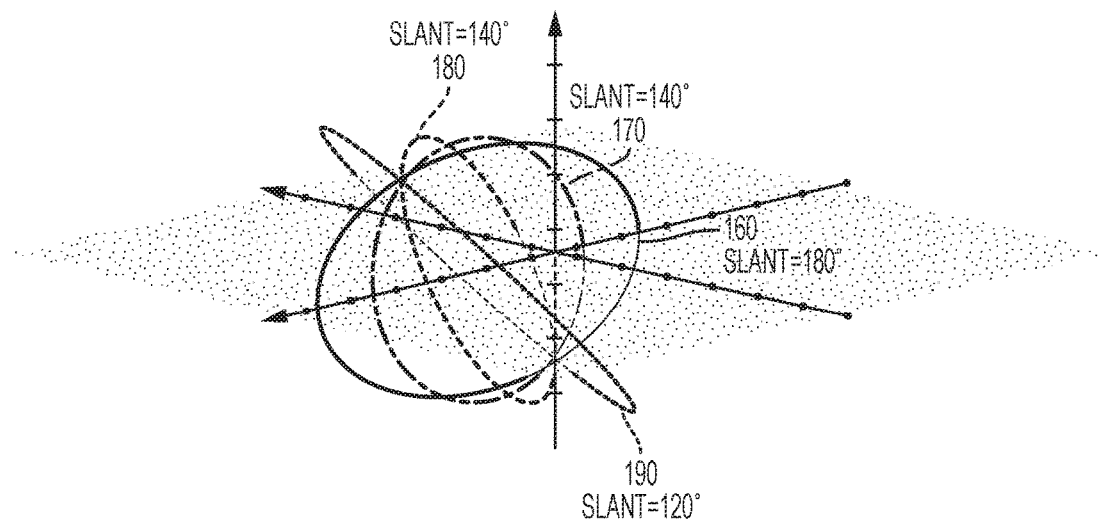
Figure 7A:
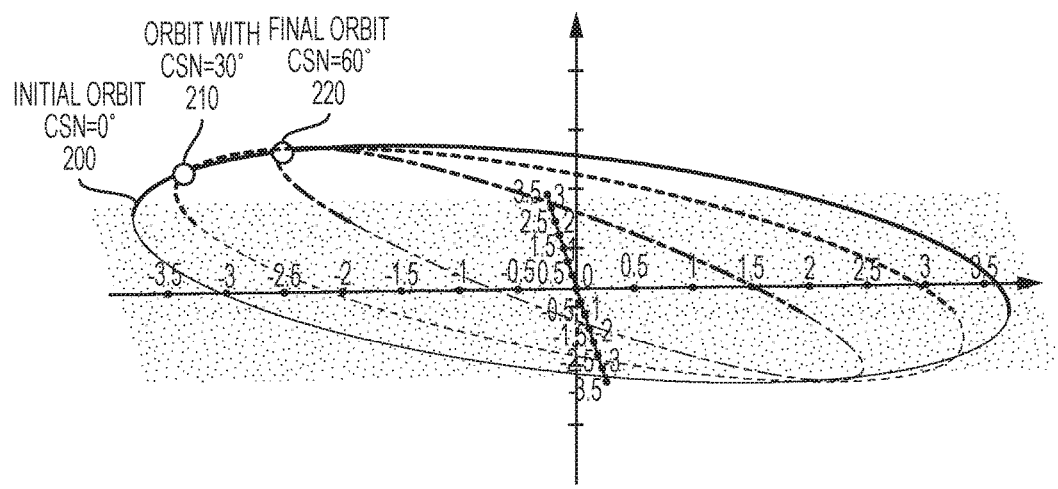
FIG. 7A-7D illustrate a maneuver to change the colatitude of the sinilaterating node of the relative orbit of the secondary spacecraft with respect to the primary spacecraft.
Figure 7B:
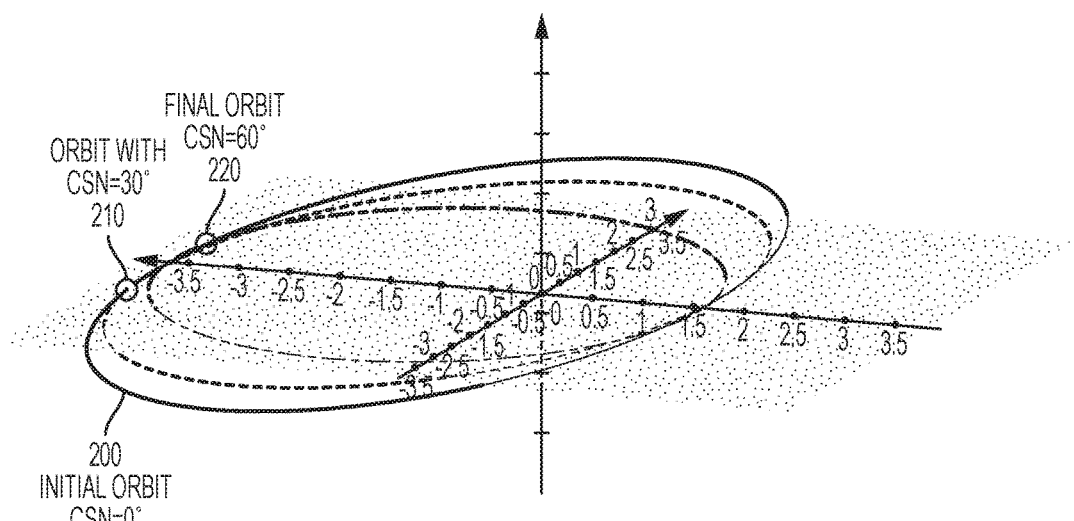
Figure 7C:
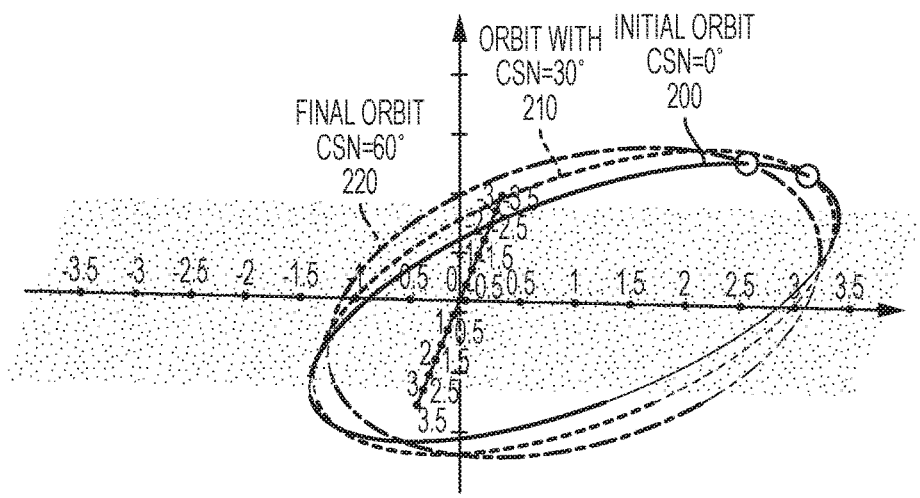
Figure 7D:
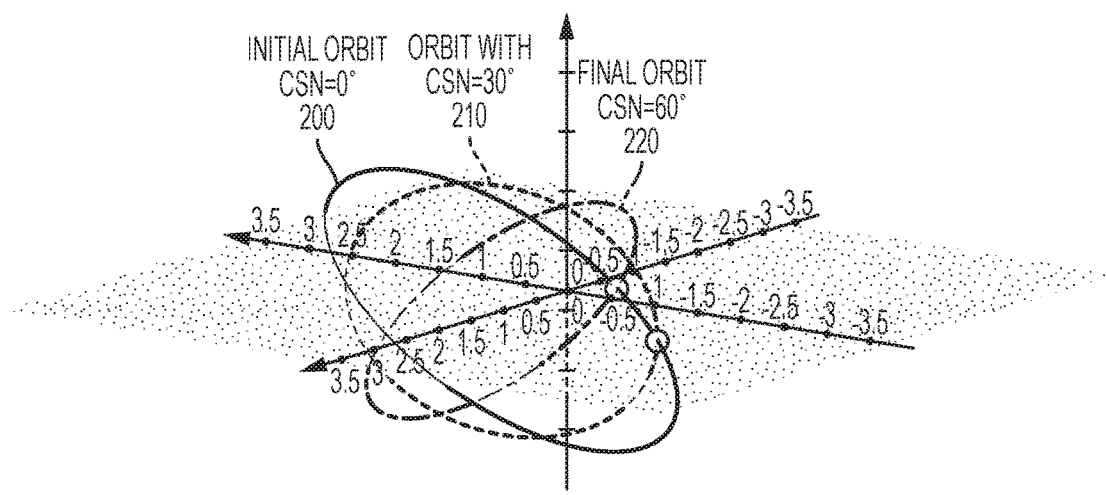

FIG. 5 illustrates one example of an onboard guidance, navigation, and control system 100 that includes a specialized space-rated computer flight processor 112 that interfaces with other spacecraft systems. The guidance, navigation, and control system uses as an input the spacecraft's position and velocity, and for proximity operations, the relative position and velocity with respect to the other spacecraft or satellite. One more or more flight GPS receivers 114 in communication with global positioning satellites 130 interfaces with and provides data to the guidance, navigation, and control computer processor 112. Navigational and positional information can also be received from onboard sensors 118 or navigation devices 116, including IMUs, star trackers, and sun sensors, with the information incorporated into the estimate of the spacecraft states by the computer processor. In many instances, the guidance, navigation and control system can also receive input via communication links 111 to an Earth-based ground station 120 or other satellites or spacecraft 140, for example, a host satellite or other satellite be inspected. The onboard flight processor software includes parameters that are particular to that spacecraft. The guidance, navigation and control system provides thrust vector signals to the propulsion control system 115, which in turn controls the thrusters or other propulsion components (not shown).

Ground based computers at the ground station 120 or other locations may be specialized computing devices that have installed software for executing flight trajectory planning, or may be computers that are copies of the onboard guidance and control computers, with interfaces to real or simulated sensors, communications devices, and spacecraft systems such as the propulsion system.

The onboard flight processor or ground station computer processor may include computer-executable instructions such as program modules. Generally, program modules including routines, programs, objects, components, data structures, and the like, refer to code that performs particular tasks or implements particular abstract data types. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions may form an interface to allow a computer to react according to a source of input. The instructions cooperate with other code segments to initiate a variety of tasks in response to data received in conjunction with the source of the received data.

Computing devices includes a bus that directly or indirectly couples the following elements: memory, one or more processors, one or more presentation components, input/output (I/O) ports, I/O components, and an illustrative power supply. Bus represents what may be one or more busses (such as an address bus, data bus, or combination thereof). One may consider a presentation component such as a display device to be an I/O component. Also, processors have memory. Categories such as "workstation," "server," "laptop," "hand held device," etc., as all are contemplated within the scope of the term "computing device." Computing devices typically include a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other tangible physical medium that can be used to encode desired information and be accessed by computing device.

Memory includes non-transitory computer storage media in the form of volatile and/or nonvolatile memory. The memory may be removable, nonremovable, or a combination thereof. Exemplary hardware devices include solid state memory, hard drives, optical disc drives, and the like. Computing device includes one or more processors that read from various entities such as memory or I/O components.

Presentation component can present data indications to a user or other device. I/O ports allow computing devices to be logically coupled to other devices including I/O components.

FIG. 6A-6E illustrate a maneuver in which the plane change involves a slant change, executed at the sinilaterating node. The four relative orbits illustrated are an orbit 160 in the fundamental plane at slant σ=180 degrees, an orbit 170 after a maneuver at σ=160 degrees, an orbit 180 after a maneuver at σ=140 degrees, and an orbit 190 after a maneuver at σ=120 degrees. FIG. 7A-7D illustrate a maneuver in which the plane change involves a change in the colatitude of the sinilaterating node. The three relative orbits shown are an initial orbit 200 at which Γ=0 degrees, an orbit 210 at which the Γ equals 30 degrees, and a final orbit 220 at which the Γ=60 degrees.

This written description sets forth example modes of the invention to describe the invention and to enable a person of ordinary skill in the art to make and use the invention. This written description does not limit the invention to the precise terms set forth. Thus, while the invention has been described in detail with reference to the examples set forth above, those of ordinary skill in the art may make alterations, modifications and variations to the examples without departing from the scope of the invention.

What is claimed as new and desired to be protected by Letters Patent of the United States is:

1. A computer implemented method for determining the required impulsive change in relative velocity of a secondary spacecraft at a maneuver location necessary to cause a plane change in an orbital path of the secondary spacecraft relative a primary spacecraft in a circular orbit, the plane change involving a change in either relative orbit slant or relative orbit colatitude of the sinilaterating node, the method comprising:
   based on a known initial relative position and initial relative velocity of the secondary with respect to the primary at an initial time, determining, with a computer processor and in the apocentral coordinate system, the maneuver location and a pre-maneuver velocity vector;
   adding, with a computer processor and in the apocentral coordinate system, a desired change in slant to a pre-maneuver slant to find a post-maneuver slant, or a desired change in colatitude of the sinilaterating node to a pre-maneuver colatitude of the sinilaterating node to find a post-maneuver colatitude of the sinilaterating node;
   determining, with a computer processor and in the apocentral coordinate system, a post-maneuver velocity vector based on the post maneuver slant or the post-maneuver colatitude of the sinilaterating node; and subsequently
   subtracting, with a computer processor and in the apocentral coordinate system, the pre-maneuver velocity vector from the post-maneuver velocity vector to determine the required impulsive velocity change of the secondary spacecraft.

2. The method according to claim 1, wherein said determining, adding, determining, and subtracting are accomplished using a set of geometric relative orbital elements for the relative orbit including semimajor axis, eccentricity, central anomaly, colatitude of the sinilaterating node, and argument of apocenter.

3. The method according to claim 1, wherein the computer processor is an onboard computer processor integral to the guidance and control system of the primary spacecraft or the secondary spacecraft.

4. The method according to claim 1, in combination with outputting the required impulsive velocity change to a spacecraft propulsion system.

5. The method according to claim 1, in combination with receiving spacecraft state information from at least one of navigation sensors and spacecraft communication systems.

6. The method according to claim 1, wherein the apocentral coordinate system is a right-hand orthogonal coordinate system defined by the ellipse of the motion of the secondary with respect to the primary in a relative orbital plane, with a primary axis being defined by a line between the primary and one of two opposite furthest points on the ellipse from the primary, a second axis being perpendicular to the first axis in the relative orbital plane, and a third axis being normal to the relative orbital plane and defined by a cross product of the primary axis and the second axis.

7. The method according to claim 1, wherein the plane change is a slant change, and further comprising:
   selecting, with a computer processor, a maneuvering point on the sinilaterating node of the relative orbit of the secondary spacecraft.

8. A guidance and control device for use on a spacecraft, comprising:
   a space-rated guidance and control computer processor having an interface for receiving positional data from a navigation or communication system and having an interface to pass information related to a propulsion control system,
   the computer processor having machine executable instructions for determining a required impulsive change in relative velocity of a secondary spacecraft at a maneuver location necessary to cause a plane change in an orbital path of the secondary spacecraft relative a primary spacecraft in a circular orbit, the plane change involving a change in either relative orbit slant or relative orbit colatitude of the sinilaterating node, by
   based on a known initial relative position and initial relative velocity of the secondary with respect to the primary at an initial time, determining, in the apocentral coordinate system, the maneuver location and a pre-maneuver velocity vector,
   adding, in the apocentral coordinate system, a desired change in slant to a pre-maneuver slant to find a post-maneuver slant, or a desired change in colatitude of the sinilaterating node to a pre-maneuver colatitude of the sinilaterating node to find a post-maneuver slant,
   determining, in the apocentral coordinate system, a post-maneuver velocity vector based on the post maneuver slant or the post-maneuver colatitude of the sinilaterating node, and
   subtracting, in the apocentral coordinate system, the pre-maneuver velocity vector from the post-maneuver velocity vector to find the required impulsive velocity change of the secondary spacecraft.

* * * * *